(No Model.) 2 Sheets—Sheet 1.

H. T. REDISKE & R. C. ABELT.
WOODWORKING MACHINE.

No. 587,756. Patented Aug. 10, 1897.

Witnesses.
O. H. Keeney
Anna V. Faust

Inventors.
Herman T. Rediske
Richard C. Abelt
By Benedict & Morsell
Attys.

(No Model.) 2 Sheets—Sheet 2.
H. T. REDISKE & R. C. ABELT.
WOODWORKING MACHINE.
No. 587,756. Patented Aug. 10, 1897.
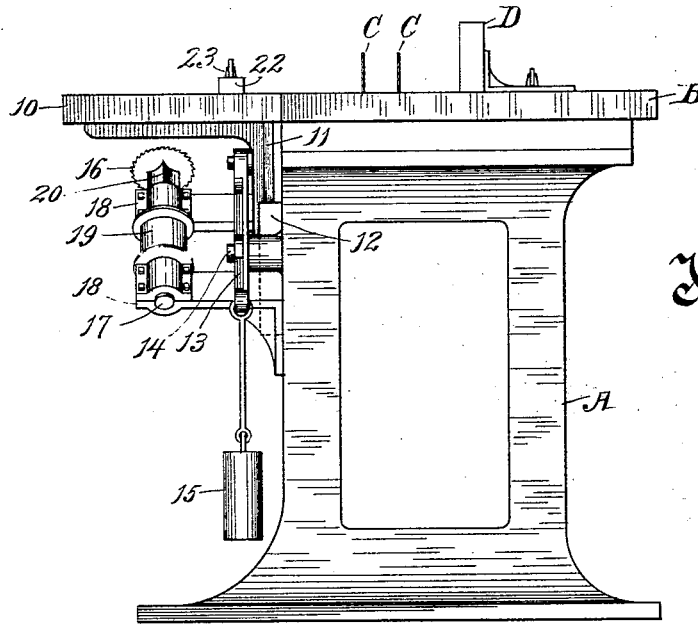
Fig. 3.
Fig. 5.
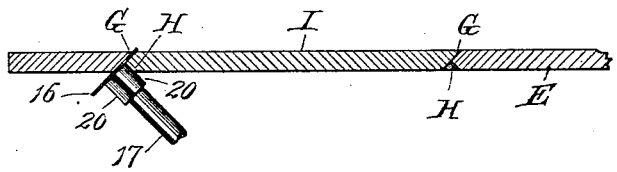
Fig. 6.
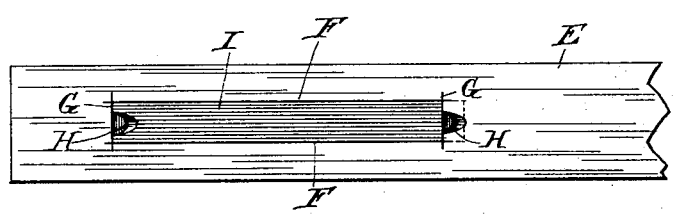
Fig. 7.
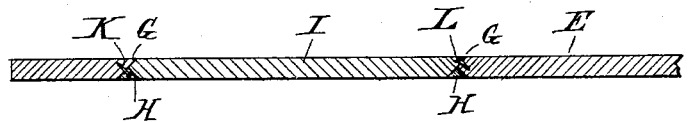
Witnesses
O. H. Keeney
Jno. V. Faust
Fig. 4.
Inventors.
Herman T. Rediske
Richard C. Abelt
By Benedict & Morsell
Attorneys.

UNITED STATES PATENT OFFICE.

HERMAN T. REDISKE AND RICHARD C. ABELT, OF MILWAUKEE, WISCONSIN.

WOODWORKING-MACHINE.

SPECIFICATION forming part of Letters Patent No. 587,756, dated August 10, 1897.

Application filed March 29, 1897. Serial No. 629,637. (No model.)

*To all whom it may concern:*

Be it known that we, HERMAN T. REDISKE and RICHARD C. ABELT, of Milwaukee, in the county of Milwaukee and State of Wisconsin, have invented a new and useful Improvement in Woodworking-Machines, of which the following is a description, reference being had to the accompanying drawings, which are a part of this specification.

The special object of our invention is to provide improved mechanism for cutting the apertures or weight-pockets in the casing or jambs of window-frames. The aperture or weight-pocket is so cut from the piece of board or material that is to form the side of the casing that the strip or piece cut out in forming the pocket is preserved and is adapted to be replaced in the aperture as a cover or closure therefor. The improved mechanism may also be used for other purposes, especially for cutting miter-joints on dado-heads and similar constructions.

The invention consists of the mechanism, its parts and combinations of parts, as hereinafter described and claimed, or their equivalents.

Figure 1:
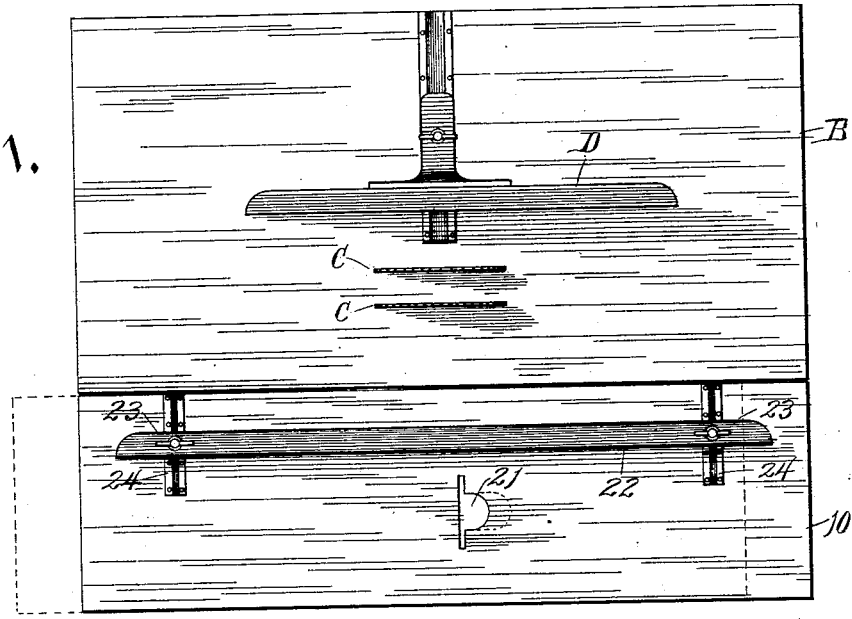
Figure 2:
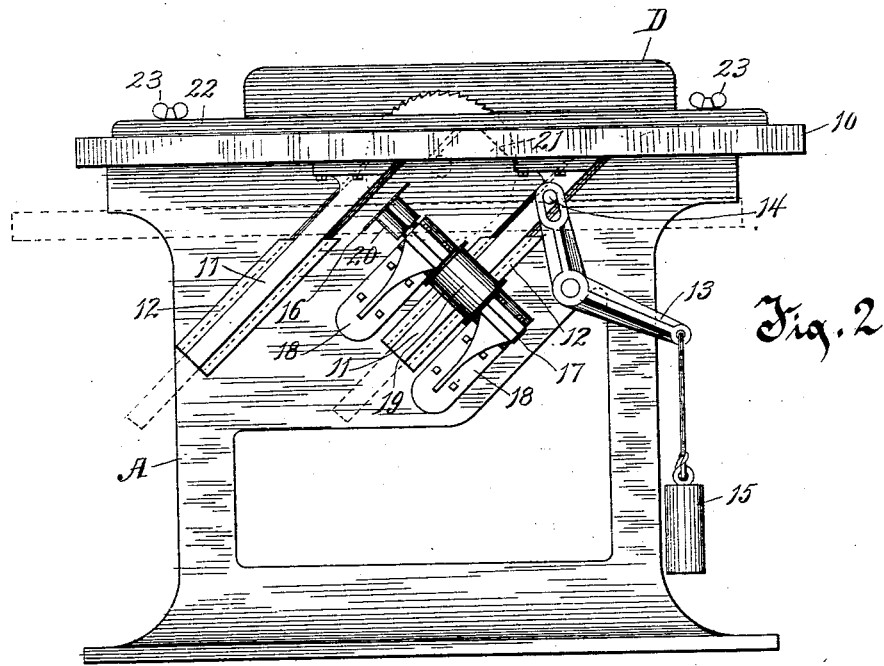

In the drawings, Figure 1 is a top plan view of a complete woodworking-machine having our improved machine or mechanism therewith as a part thereof. Fig. 2 is a side elevation of the improved machine, showing the principal features and construction of our improvements. Fig. 3 is an end elevation of the complete machine embodying our improvements. Fig. 4 is a detail of the saw and the cutters employed in our improved mechanism. Fig. 5 is a longitudinal section of a fragment of a board for the side of the window-casing being cut by our improved mechanism. Fig. 6 is a rear view of the fragment of the board for a window-casing in which the aperture or weight-pocket has been cut. Fig. 7 is a central longitudinal section of the board or fragment of a window-casing shown in Fig. 6 with stops affixed, as in use.

Woodworking-machines having suitable frames A with a flat horizontal or tiltable top B, which tops are either stationary or adjustable vertically or otherwise, and with cutting-saws C C mounted on arbors journaled in the frame and with an adjustable gage D are in common use.

Our invention consists in the providing of mechanism, preferably attached to such a machine as just mentioned, for performing the additional work hereinbefore mentioned in a suitable, convenient, and satisfactory manner. For this purpose a horizontally-disposed table 10, provided with downwardly-extending guide-legs 11 11, disposed at an angle of forty-five degrees to the top surface of the table 10 and mounted and sliding in fixed ways 12 12 therefor on the frame A, also at an angle of forty-five degrees to the table, is supported yieldingly at a predetermined height by automatic means, preferably of a crank-lever 13, pivoted medially on the frame A and connected movably to the table 10 by means of a pin 14, fixed in one of the legs 11 and projecting into an elongated slot therefor in one of the arms of the lever, the other arm of the lever being so disposed as to project in a lateral direction, the lever being automatically actuated by the weight 15, suspended from the laterally-disposed arm thereof.

A circular saw 16 is fixed on an arbor 17, which arbor is mounted revolubly in suitable boxes therefor in brackets 18, secured to the frame A. The arbor 17 is disposed at a right angle to the axis of the legs 11, so that the saw 16 is disposed and adapted to cut at an angle of forty-five degrees to the surface of the table 10. A pulley 19 on the arbor 17 provides for a belt to run thereon to drive the saw. Axially-disposed cutters 20 20 are fixed on the arbor 17, abutting against and at the rear of the saw 16. A saw-and-cutter aperture 21 is provided in the table 10, the table and the aperture being so disposed that as the table is depressed in the ways 12 the table will be carried down to and partially below the saw and the cutters, to the extent and in the manner indicated by dotted lines in Fig. 2. It will be understood that when the saw and cutters are rotating a piece of material placed on the table 10 and depressed therewith to the extent and in the manner indicated will be cut through by the saw, and the cutters will cut into the material in the manner and to the extent shown in Fig. 5. A gage 22 on the table 10, adjacent to the aperture 21, is secured to the table adjustably by holding-screws 23 23, movable in ways 24 24 therefor on the table.

In use a board or material E is placed on the table B, and the longitudinal cuts F F are made through the board by the saws C C, and the board is then transferred to the table 10, and by depressing the table to the saw 16 and cutters 20 in the manner hereinbefore described the end cuts G G may be successively made by the saw 16, the recesses H H being concurrently produced in the board E and in the closure I, respectively. When the board E is put into the window-frame, a stop K, which may be simply a nail or screw, is inserted in the material E so as to be at the rear of the closure I in the recess H, and a screw or pin L is inserted from the face through the closure I into the material E at the other end of the closure.

What we claim as our invention is—

1. The combination with a permanent support, of a yielding material-holding table provided with a saw-aperture, a circular saw mounted on the permanent support, the saw being so disposed as to cut at an oblique angle to the table and the table being adapted to yield or move toward and from the saw in an oblique direction to the face of the table.

2. The combination with a permanent support and a circular saw mounted rotatively thereon and so disposed as to cut at an oblique angle to a material-holding table, of a material-holding table, mounted movably on the permanent support and so as to move toward and from the saw in the direction of its cutting but at an oblique angle to the supporting-surface of the table, and means adapted automatically to hold the table away from the saw but to permit it to be moved to the saw.

3. The combination with a permanent support and a circular saw mounted rotatively thereon and so disposed as to cut at an oblique angle to a material-holding table, of a material-holding table provided with obliquely-disposed legs movable endwise in correspondingly-disposed ways on the permanent support and so as to permit the table to move toward and from the saw at an oblique angle to the surface of the table, and means automatically supporting the table yieldingly.

4. The combination with a permanent support, of a yielding material-holding table provided with a saw-and-cutter aperture, a circular saw and cutters abutting thereto on an arbor mounted on the permanent support, the saw and the cutters being so disposed as to cut at oblique angles to the surface of the table and the table being adapted to yield or move toward and from the saw and cutters in an oblique direction to the face of the table.

5. The combination with a frame and a plurality of circular parallel-cutting saws mounted thereon, of a single circular saw mounted on the frame, and so disposed as to cut at an oblique angle to a material-holding table and an independent yielding table provided with a saw-aperture mounted on the frame and movable toward and from the single saw at an oblique angle to the surface of the table.

In testimony whereof we affix our signatures in presence of two witnesses.

HERMAN T. REDISKE.
RICHARD C. ABELT.

Witnesses:
ANNA V. FAUST,
C. T. BENEDICT.